L. B. HUBBELL.
Thrashing Machine.

No. 52,048.

Patented Jan'y 16, 1866.

Witnesses:

Inventor:
L. B. Hubbell

UNITED STATES PATENT OFFICE.

L. B. HUBBELL, OF ALTON, ILLINOIS.

IMPROVEMENT IN GEARING FOR THRASHING-MACHINES.

Specification forming part of Letters Patent No. 52,048, dated January 16, 1866.

*To all whom it may concern:*

Be it known that I, L. B. HUBBELL, of Alton, in the county of Madison and State of Illinois, have invented a new and useful Improvement in Gearing for Grain-Thrashing Machines; and I do hereby declare that the following is a full, clear, and exact description thereof, which will enable those skilled in the art to make and use the same, reference being had to the accompanying drawings, forming part of this specification, in which—

Figure 1:
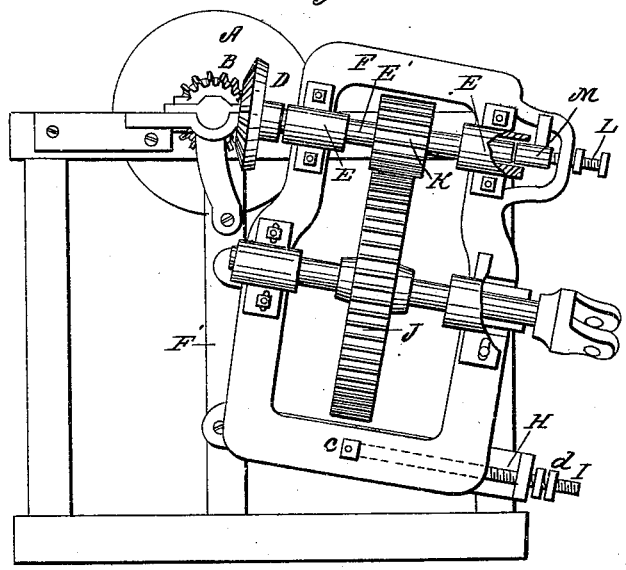
Figure 2:
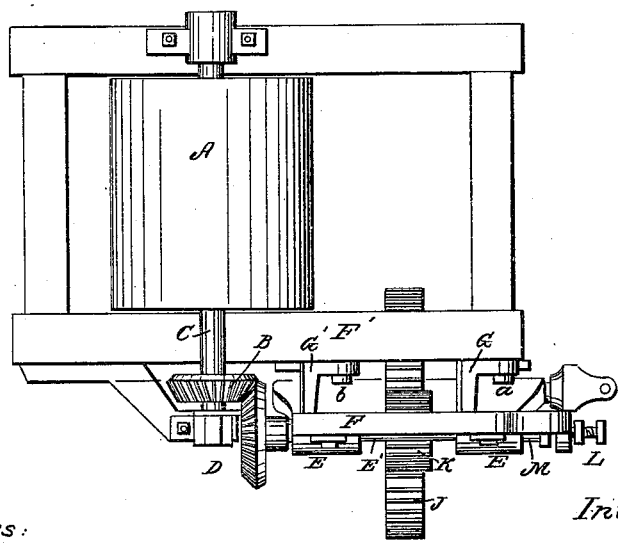

Figure 1 is a side view of my invention; Fig. 2, a plan or top view of the same.

Similar letters of reference indicate corresponding parts.

The object of this invention is to obtain a simple means to compensate for the wear of the cylinder-shaft and the bevel-wheel shaft of thrashing-machines. The cylinder-shaft has a tendency to wear its bearings in a downward direction, while the bearings of the bevel-wheel shaft wear upward, and the bevel-gears on said shafts are consequently soon thrown out of line with each other, causing a great loss of power and much wear and tear.

My invention consists in placing the bevel-wheel shaft in an adjustable frame, and so arranging the shaft in said frame that the gears may always be kept in line with each other and made to mesh properly.

A represents the cylinder of a thrashing-machine, and B a bevel-pinion on one end of the shaft C thereof.

D represents a bevel-wheel which gears into the pinion B and has the bearings E E of its shaft E' in a frame, F, which is secured to the side of the frame F' of the thrashing-machine as follows: The upper part of the frame F is provided with two lugs, G G', through one of which a bolt, *a*, passes into the frame F', and a bolt, *b*, passes through a curved slot in the other lug, G', into frame F', thereby admitting of the frame F being adjusted or turned from the bolt *a* as a center. Through the lower part of the frame F a bolt, *c*, passes, said bolt also passing through a curved slot in a bar, H, attached to the frame F', and a screw-rod, I, is connected to a sleeve on said bolt, the screw-rod passing through a lug at the outer end of bar H, and having a nut, *d*, upon it. By loosening the nut of the bolt *b* and turning the nut *d* of rod I the frame F may be adjusted so as to keep the bevel-wheel D in gear with the bevel-pinion B.

The shaft C of the thrashing-cylinder A has a tendency to wear its bearings downward, while the bearings of the shaft E' of the wheel D wear upward, said shaft being driven by a spur-wheel, J, which gears into the lower part or under side of a pinion, K, upon it, as shown in Fig. 1. It will be seen, therefore, that after a certain amount of wear of the bearings of said shafts in the direction specified the pinion B and wheel D will be out of line with each other, and will not work properly, and that by adjusting the frame F so as to bring the wheel D down the latter may be placed in line with the pinion B. In doing this, however, the wheel and pinion may not mesh as deep as before, and this defect I remedy by having the shaft E' of the wheel D adjustable in its bearings E E in a longitudinal direction, a set-screw, L, passing through the frame F and bearing against a cylinder, M, which is fitted in one of its bearings E, as shown clearly in Fig. 1. Thus by this simple means the two wheels B D may always be kept in line with each other, and also kept in proper mesh, however much the bearings of the thrashing-cylinder and shaft E' may wear.

The spur-wheel J may be set up to the pinion K at any time, when necessary, by having the bearings N of its shaft adjustable.

Having thus described my invention, I claim as new and desire to secure by Letters Patent—

1. The placing of the shaft E' in an adjustable frame, F, arranged and applied to the framing of the thrashing-machine in such a manner that the bevel-wheel D may be adjusted in a proper relative position with the wheel B to compensate for the wear of the bearings of the shafts C E' of the thrashing-cylinder and the wheel D, as set forth.

2. The set-screw L and cylinder M, arranged relatively with the bearing of the shaft E' to admit of the longitudinal adjustment of said shaft and the keeping of the wheels B D in gear with each other, substantially as described.

L. B. HUBBELL.

Witnesses:
S. F. CONNOR,
R. R. LOGAN.